June 19, 1945.　　　C. E. WATSON　　　2,378,605
PORTABLE HOIST
Filed Feb. 7, 1942　　　5 Sheets-Sheet 1

INVENTOR.
CHARLES E. WATSON.
BY Harry C. (signature)
ATTORNEY.

June 19, 1945.　　C. E. WATSON　　2,378,605
PORTABLE HOIST
Filed Feb. 7, 1942　　5 Sheets-Sheet 2
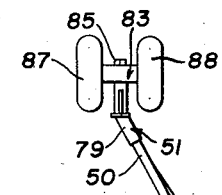
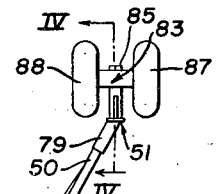
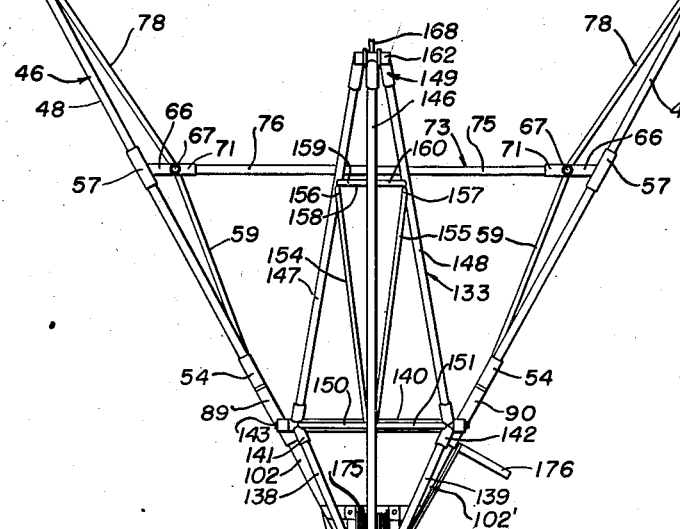
FIG. 3.
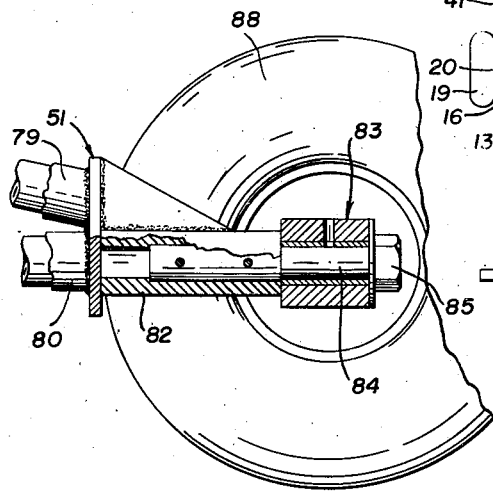
FIG. 4.
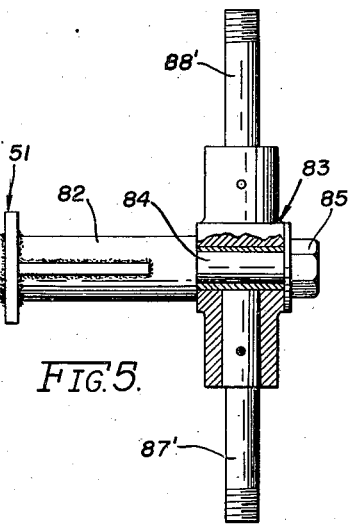
FIG. 5.
INVENTOR.
CHARLES E. WATSON.
BY
ATTORNEY.

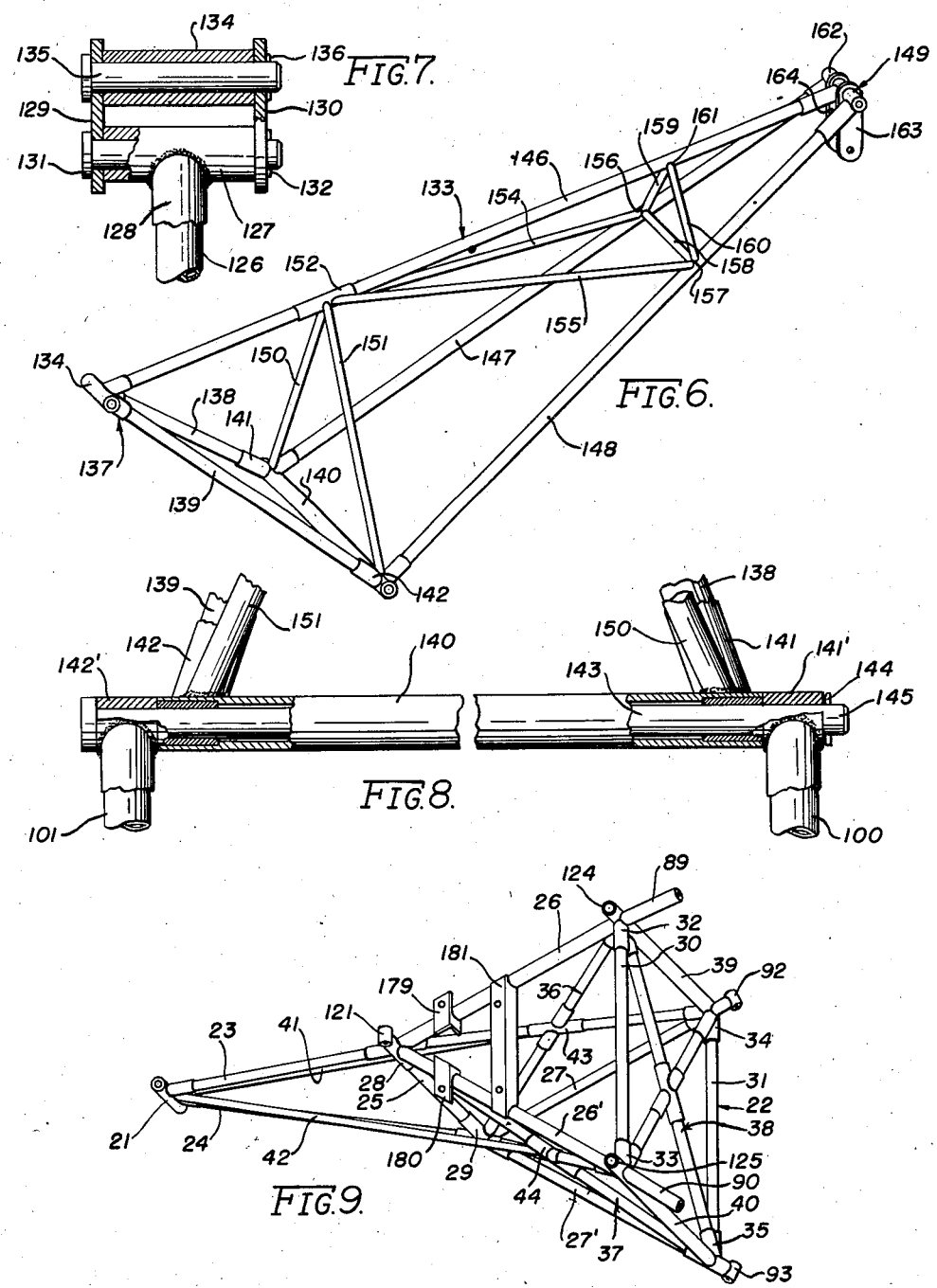

June 19, 1945. C. E. WATSON 2,378,605
PORTABLE HOIST
Filed Feb. 7, 1942 5 Sheets-Sheet 4
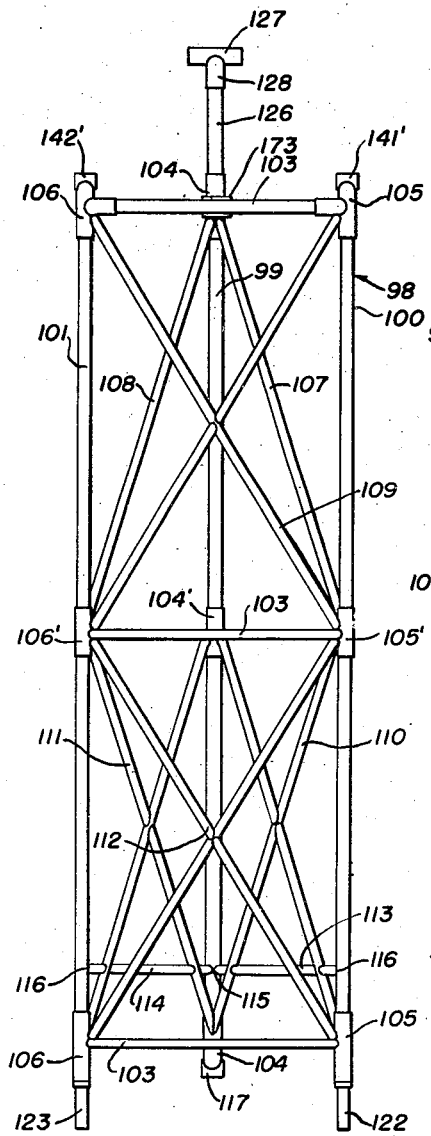
FIG.10.
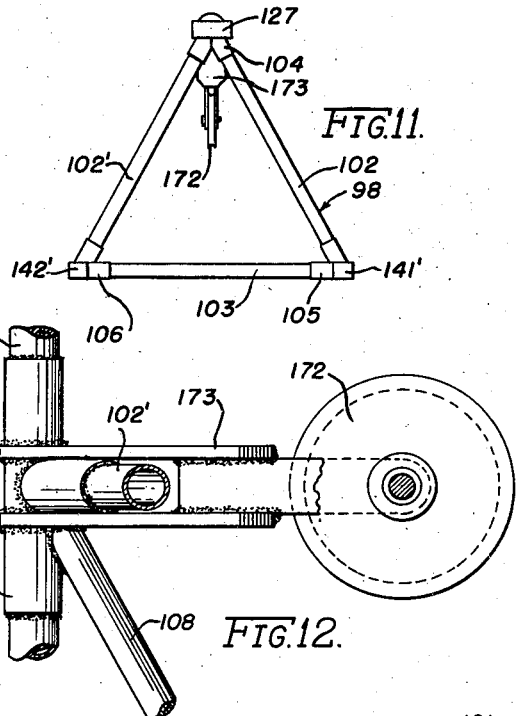
FIG.11.
FIG.12.
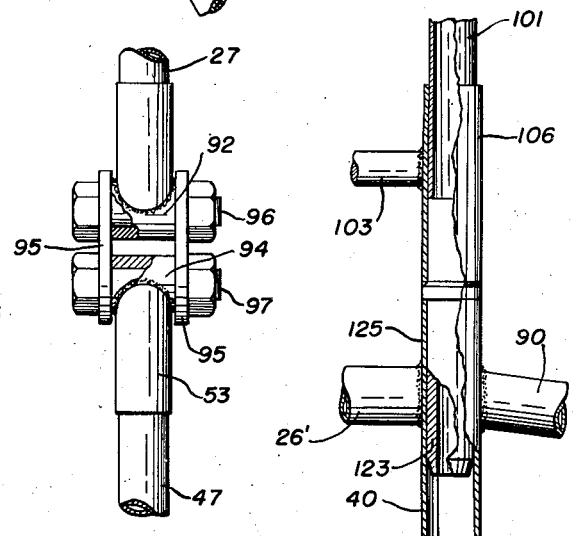
FIG.13.
FIG.14.
INVENTOR.
CHARLES E. WATSON
BY
ATTORNEY.

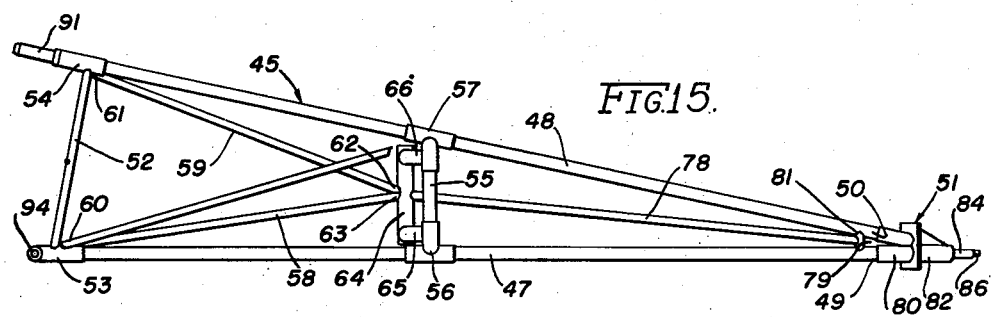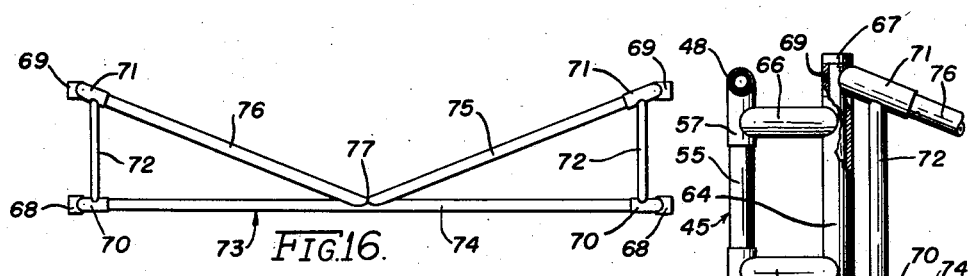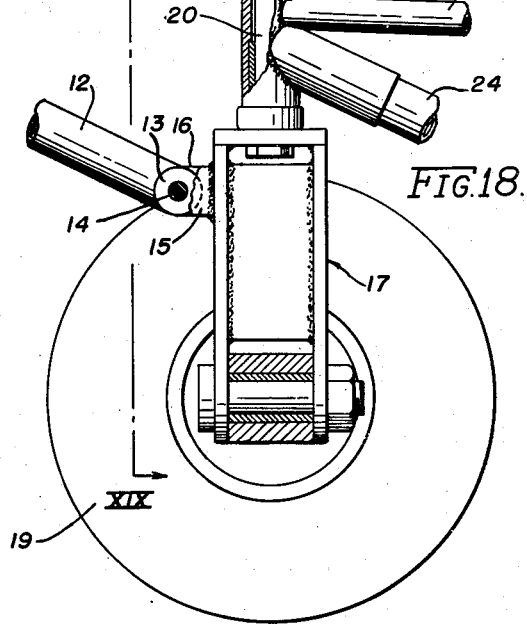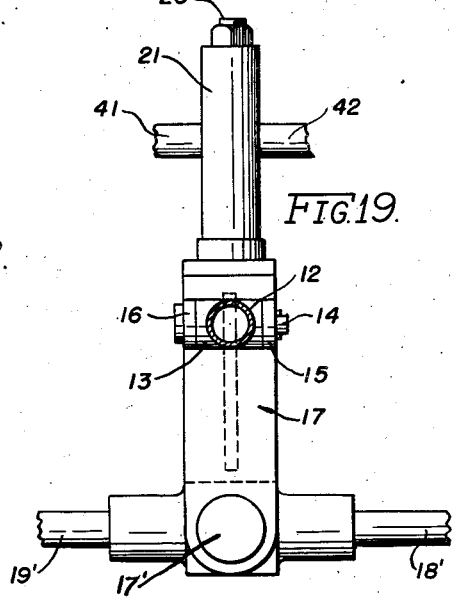

Patented June 19, 1945

2,378,605

UNITED STATES PATENT OFFICE 2,378,605

PORTABLE HOIST

Charles E. Watson, Chicago, Ill., assignor to Bird-White Corporation, Chicago, Ill., a corporation of Illinois Application February 7, 1942, Serial No. 429,931

9 Claims. (Cl. 254—139.1)

This invention relates to portable hoists and more particularly to hoists of sectional construction, although certain features thereof may be employed with equal advantage for other purposes.

It contemplates more especially the provision of a sectional hoist of the portable type which may be readily assembled and dismantled for rendering such equipment readily transportable to distant locations without entailing any appreciable labor, time or expense.

Hoists are essential service equipment in conjunction with vehicles such as airplanes in that there is a variety of hoisting problems in the cleansing, servicing and replacement of parts. In the servicing of large vehicles such as airplanes it is not practical to have fully equipped stationary service shops at all airports or hangars at which the airplanes may be readily landed, housed, or repair service may be required for routine or emergency purposes. Airplanes are becoming increasingly large structural bodies or units and service equipment must necessarily be brought to such huge units that are to be serviced. This physical limitation coupled with the requirement for complete mobility in effecting the transfer of such servicing equipment from one station to another or from one airport to another or from one emergency landing area to another depending upon routine or emergency requirements, suggests the desirability of providing section-built heavy duty service equipment. For instance, intricate or large equipment such as hoists or similar maintenance-equipment are not usually available in sufficient numbers to provide all servicing stations or airfields therewith so that even under ordinary conditions of maintenance, it may become necessary to transport such heavy equipment to the service requirements of widespread geographic locations.

Airplanes are also put out of service or restorative repair and replacement must be made at points of forced landing so that complete mobility of heavy maintenance equipment such as hoists, is an extremely advantageous structural feature. To meet such unusual requirements, it is proposed to provide heavy servicing equipment of sectional construction so that they may be dismantled and transported by airplane or other suitable transportation mediums to the situs of such service requirements and there assembled as readily as dismantled. While portable hoists have long been available, yet the requirement for their availability at the situs of repair renders known construction not entirely satisfactory from that standpoint.

To this end, the present invention eliminates the comparative immobility of such equipment by providing a sectional construction of self-contained units that are readily assembled and dismantled to meet varying and repeated changes in the situs requirements therefor. To this end, the dismantled sections are readily placed in the vehicle such as an airplane for delivery to any needed point of use. This accomplishment coupled with the features of rendering such readily assembled and dismantled without impairment by the stresses and strains that are to be carried by the parts, is rendered possible with the teachings of the present invention.

One object of the present invention is to simplify the construction and improve the operation of devices of the character mentioned.

Another object is to provide a structural body comprising self-contained sections that are readily assembled and dismantled to comprise a self-contained hoist for convenience in transporting to different situs requirements.

Still another object is to provide a plurality of self-contained telescopic units that are readily assembled and dismantled to comprise a self-contained hoist for convenience in transporting to different situs requirements.

A further object is to provide self-contained truss rod telescopic units to comprise a portable hoist for ready assembling and dismantling to meet different situs requirements.

A still further object is to provide a sectional hoist of improved construction.

Still a further object is to provide vertical and angularly disposable self-contained truss rod units to comprise a telescopically assembled sectional hoist or the like.

Other objects and advantages will appear from the following description and illustrated embodiment of the present invention.

In the drawings:

Figure 3 is a plan view of the device shown in Figure 1.

Figure 4 is an enlarged fragmentary sectional view taken substantially along line IV—IV of Figure 3.

Figure 5 is an enlarged fragmentary sectional view of the front axle construction.

Figure 6 is a perspective view of the boom section of the hoist structure.

Figure 7 is an enlarged fragmentary sectional detail view of the rear boom connection.

Figure 8 is an enlarged fragmentary sectional view of the lower boom pivot or section connection rod.

Figure 9 is a perspective detail view of the hoist base, parts thereof being broken away to clarify the showing.

Figure 10 is a front view in elevation of the vertical column section.

Figure 11 is a plan view of the vertical column section shown in Figure 10.

Figure 12 is an enlarged fragmentary view of the idler or guide sheave connection.

Figure 13 is an enlarged fragmentary detail view of the tension pin connection.

Figure 14 is an enlarged fragmentary detail view of the compression pin connection, parts thereof being broken away and sectioned to clarify the showing.

Figure 15 is a perspective detail view of one of the truss-rod leg sections.

Figure 16 is a front detail view in elevation of a leg cross-tie member or unit.

Figure 17 is an enlarged fragmentary detail view of the leg cross-tie member connection.

Figure 18 is an enlarged detail view of a front steering wheel assembly.

Figure 19 is a sectional view taken substantially along line XIX—XIX of Figure 18.

Figures 1, 2:
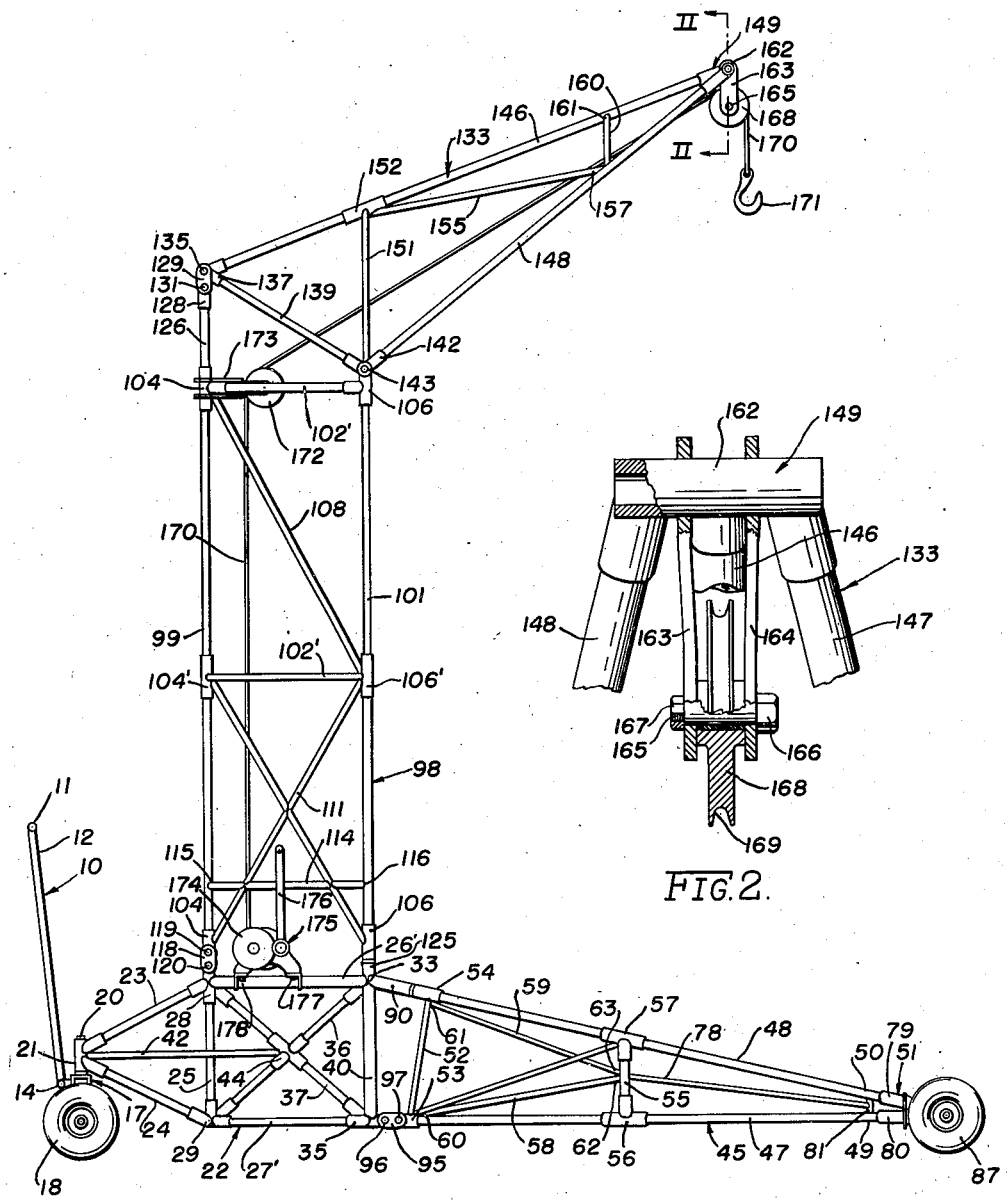
Figure 1 is a side view in elevation of a sectional hoist embodying features of the present invention.
Figure 2 is an enlarged fragmentary sectional view taken substantially along line II—II of Figure 1.

The structure selected for illustration comprises a handle member 10 consisting of a terminal cross-bar 11 to enable manual grasp thereof in exerting a pull and steering influence upon an elongated tubular hand rod 12. The elongated tubular rod 12 terminates in a transverse collar 13 welded or otherwise attached thereto depending upon the dictates of commercial practice. The collar 13 receives a carriage bolt 14 axially therethrough to bridge space plates 15—16 (Figure 3) constituting a part of a double wheel castor bracket 17 (Figures 1 and 18). Closely spaced double wheels 18—19 are journalled on the castor bracket 17 that pivots in a horizontal plane for steering purposes. The wheel mounting castor bracket 17 has a vertically extending stud 20 which is journalled in the vertical tubular bearing 21 constituting a part of the base assembly section 22. The castor mounting bracket 17 has an axle 17' to vertically pivot stub shafts 18'—19' on which wheels 18 and 19 are journalled.

The base assembly 22 consists, in this instance, of truss rods which are designed to withstand heavy stresses and strains induced by the sustaining load and the movement thereof along the ground or surface. In the present embodiment the base section 22 (Figures 1 and 2) has diverging rods 23—24, in this instance two, disposed in a vertical plane which emerge from the vertical bearing sleeve 21 for welded juncture therewith. The diverging ends of rods 23—24 are welded or otherwise attached to a vertical truss rod 25 which constitutes the forward edge of the substantially triangular base frame 22. The triangular section of the base frame 22 has upper and lower converging struts 26—27 and 26'—27' (Figure 9) that are joined with the vertical forward rod 25 and diverging struts 23—24 through the medium of welded tubular socket brackets 28—29 to enable their effective welded joinder. The triangular section of the base frame 22 is defined by superposed truss rods 30—31 that are joined through corner socket brackets 32—33 and 34—35 to connect the base rods 30—31 to the triangularly disposed divergent rods 26—26' and 27—27' to define a triangular base section having forwardly extending brace rods 23—24 serving as a support for the vertical bearing sleeve 21.

In order to rigidify the triangular base frame 22 and increase the carrying load thereof, intersecting diagonal truss rod braces 36, 37 and 38 are welded or otherwise joined to the upper and lower diverging side and triangle forming base rods 26, 26'—30 and 27, 27'—31 of the base section 22. It should be noted that vertical rods 39 and 40 complete the triangular sides and base to serve as a base for both triangular frames 26—27 and the substantially rectangular frame base 30—31. Auxiliary side rods 41—42 converge at the vertical bearing sleeve 21 for welded joinder therewith so that the other extremities thereof will merge with the welded tubular socket brackets 43—44 constituting the intersecting medium for the side triangular frame braces 36—37. Thus a rigid self-contained frame base section 22 is provided for forward support by the wheels 18—19 mounted on the castor brackets 17.

The base frame section 22 is supported rearwardly by converging leg sections 45 and 46 which constitute self-contained units adapted for telescopic association with the base frame 22 as will presently appear. While the leg sections 45—46 are of opposite inclination to comprise a left and right section, other than for this change in inclination the structural features of each are identical so that a description of one is equally applicable to the other. It should be observed that the leg sections 45—46 comprise in this instance a horizontally disposed lower rod 47 having an inclined rod 48 in superposed relation therewith for intersecting engagement at their rearward extremities 49—50 which are complements of a socket bracket 51 to which the rod extremities 49—50 are welded or otherwise permanently joined. The forward extremities of the rods 47—48 are inter-connected or braced by means of a strut 52 which completes a triangular section by being joined thereto through the medium of corner rod socket brackets 53—54. Intermediate the apex 51 and the base 52 of the triangular sections 45—46, a vertical reinforcing strut 55 is provided to comprise a brace intermediate the ends thereof.

To this end, the bracing strut 55 is joined to rod socket brackets 56—57 that envelop the rods 47—48 for permanent attachment thereto in the plane of the triangular section 47—48—52. Lateral bracing of each leg section 45—46 is effected by converging rods 58—59 anchored to the corner socket brackets 53—54 as at 60—61 with their other extremities 62—63 converging with a vertical brace rod 64 (Figure 15) which is welded or otherwise joined thereto.

The vertical brace rod 64 is spaced laterally from and supported by the vertical strut 55 through the medium of vertically spaced horizontal tube braces 65—66, the latter being welded to the brace rod 64 and the strut 55. The tubular brace rod 64 has a pin 67 extending vertically therethrough to engage the lower and upper vertical bearings 68—69 comprising portions of socket brackets 70—71, respectively. These are maintained and spaced in vertical relation to correspond with the length of the vertical brace rod 64 by means of vertical spacer rods 72 provided at both extremities of a cross-tie member 73 (Figure 16). The cross-tie member 73 comprises a lower horizontal rod 74 and intersecting angular rods 75—76 that are welded thereto as at 77 intermediate the extremities of the horizontal rod 74. The other extremities of the converging rods 75—76 are welded or otherwise anchored to the upper socket bracket 71 to maintain the lower and upper vertical bearings 68—69 in vertical axial alignment. As a result, the leg units 45—46 are maintained in spaced relation by means of the connecting tie member 73 at substantially the point where the extremities 62—63 merge with each other into the brace rod 64 (Figure 15). The lateral offset rods or struts 58—59 serve as a counterpart of a triangular rod 78 that extends from the vertical median position of the vertical brace rod 64 to the terminal socket bracket 51 of each leg unit 45—46. To this end, the terminal socket bracket 51 has an intermediate socket 79 extending therefrom as at 80 (Figure 15) to telescopically receive the lateral offset bracing rod 78 for welded joinder thereto as at 81. It will be apparent, therefore, that each leg unit 45—46 is reinforced both in the plane thereof and laterally therefrom to comprise a self-contained rigid unit.

The terminal socket brackets 51 on each of the leg units 45—46, have an angularly offset castor supporting shaft 82 which extends at the proper angle relatively to the angularity of the leg units 45—46 to coincide with the linear path of movement of the base frame 22 as will appear more fully hereafter. A double-wheeled castor bracket or truck 83 is bored to receive the axle extension 84 of the terminal bracket shaft 82 for retention thereon by any suitable means such as a fastener nut 85 which is in engagement with a threaded extremity 86 on the terminal bracket axle 84. As a result, the terminal brackets 51 of the leg units 45—46 carry closely spaced double-wheels 87—88 mounted on stub shafts or axles 87'—88' to cooperate with the correspondingly sized double-wheels 18—19 journalled on the forward steering castor bracket 17 to serve as a mobile support for the base frame 22 and the angularly disposed leg units 45—46.

In order to detachably connect the leg sections or units 45—46 to the base frame sections or units 22, the upper angularly disposed rods 26 of the base frame unit 22 extend beyond the vertical struts 39—40 to provide tubular extensions 89—90 (Figure 9) serving as complements of correspondingly sized and shaped pins 91 extending through the upper corner rod socket brackets 54 (Figure 15). The tubular rod extensions 89—90 on the base frame unit 22 telescopically receive the uper pins 91 extending from the top corner rod bracket 54 on each of the leg units 45—46. On the other hand, the lower angularly disposed rods 27 of the base frame unit 22 extend beyond the vertical struts 39—40 to provide transversely disposed tubular bearings 92—93 which are adapted to confront correspondingly shaped and sized tubular bearings 94 integrally or otherwise attached to the lower corner rod socket brackets 53 of each of the leg units 45—46. Spaced plates 95 are apertured to correspond with the bores in the adjacently disposed tubular bearings 92—94 (Figure 13) and 93—94 so that a permanently connected pin 96 may extend therethrough to engage the tubular bearings 92—93 to afford the reception of the lower tubular bearings 94 of the leg sections 45—46. With this arrangement, another pin or bolt 97 may be detachably associated with the space bracket 95 to project through apertures thereof in alignment with the lower bearings 94 for projection therethrough in detachably connecting leg units 45—46 to the base frame unit 22 against accidental separation. This enables the leg units 45—46 to be detachably associated with the base frame unit 22 so that they may be readily assembled or dismantled depending upon the requirements of commercial practice or any particular usage. This provides a portable sub-structure of sectional construction for any instrumentalities that may be advantageously supported therewith.

In the present embodiment, the superstructure preferably though not essentially comprises a vertical column section 98 (Figures 1 and 10). The vertical column 98 is, in this instance, of triangular cross-section to correspond with the triangular configuration of the section 26—26'—30 of the base frame unit 22. To this end, three vertical struts 99, 100 and 101 are disposed for alignment with the vertical rods 25, 39 and 40 of the triangular section of the base frame 22 which are braced to conform therewith by means of triangularly arranged upper, intermediate, and lower angularly disposed triangle forming rods 102, 102' and 103 corresponding with the diverging rods 26—26' and 27—27' of the triangular sections of the base frame 22 defined by the upper and lower rods 26—26'—30 and 27—27'—31.

In the present embodiment there are three sets of triangular braces 102, 102' and 103 that are interposed between the vertical corner rods 99, 100 and 101. These are connected to forward corner socket brackets 104 (Figures 1 and 10) and rearward corner socket brackets 105—106 (Figure 10). The rods 102—102' and 103 are welded or otherwise joined to corner rod sockets 104—105—106 which are welded or otherwise anchored to the upper and lower extremities of the corner rods 99—100 and 101 defining the vertical column 98. Also intermediate the length of the vertical corner rods 99, 100 and 101, the rod socket brackets 104', 105' and 106' are disposed to receive the vertical corner rods 99, 100 and 101 therethrough. Suitable fastening expedients such as welding or the like may be utilized to permanently join the corner brackets 104', 105' and 106' to the vertical corner rods 99, 100 and 101 intermediate the length thereof so that the superposed sets of triangularly disposed rods 102, 102' and 103 will effectively maintain the vertical corner rods 99, 100 and 101 in properly spaced relation. The vertical column 98 is also braced by inclined struts 107 and 108 that are welded or otherwise joined between the corner brackets 104—105' and 104—106' (Figures 1 and 10). Intersecting diagonal struts 109 are welded or otherwise joined to the corner brackets 105—106 and 105'—106' to brace the upper rear plane of the vertical column defined by the upper portion of the corner rods 100—101. The lower half of the vertical column 98 is braced by intersecting diagonal struts 110, 111 and 112 which are interposed for welded joinder between the corner brackets 104'—105'—106', and the lower corner brackets 104, 105, 106, respectively. In order that the vertical column may be more securely braced near the bottom 98 thereof where the maximum load would be sustained, horizontal brace rods 113 and 114 are welded or otherwise secured to the forward corner rod 99 with their other extremities terminating in the corner rods 100—101 as at 115—116, respectively, this being effected after the brace rods 113—114 are appropriately welded to the lower legs of the intersecting diagonal struts 110—111.

The vertical column 98 is detachably associated with the triangular section of the base frame 22 by telescopic association therewith. To this end, the forward corner rod 99 has a transverse tubular bearing 117 to provide connection with space plates 118 through the medium of a bolt 119. Another bolt 120 (Figure 1) engages a corresponding tubular transverse bearing 121 (Figure 9) disposable adjacent to the transverse bearing 117 (Figure 10) to effect locking engagement therebetween. The transverse tubular bearing 121 constitutes an extension of the corner bracket 28 to which the base frame vertical rod 25 is welded, thereby enabling the detachable connection of the column 98 to the correspondingly shaped triangular section of the base frame 22. The vertical corner rods 100 and 101 of the column 98, are provided with depending extensions 122—123 (Figure 10) extending from the lower corner brackets 105—106, to telescopically project within upstanding tubular extensions 124—125 constituting a part of the base frame vertical corner rods 39—40. This provides for the detachable association of column 98 in vertical linear alignment with the triangular section of the base frame 22, the lower extension 122—123 of the column 98 being retained in telescopic association with the tubular extension 124—125 by the weight of column 98 together with whatever load will be sustained thereon as will appear more fully hereinafter.

In order to sustain a boom in an angularly disposed position for support on the vertical column 98, the forward column rod 99 thereof extends beyond the upper corner bracket 104 to provide an upwardly directed extension 126 (Figures 1 and 7) terminating in a transverse tubular bearing 127 welded or otherwise attached thereto through its shank 128. The transverse bearing 127 is disposed between spaced plates 129—130 which are bored to receive a pin 131 therethrough in alignment with the bore of the bearing 127. A cotter pin 132 may be utilized to retain the free extremity of the pin 131 against accidental withdrawal from the bearing 127 and plates 129—130 (Figure 7). To the end of securing a boom 133 to the vertical column 98, a transverse tubular bearing 134 is disposed between the place plates 129—130 to receive another pin 135 therebetween after projecting through the tubular bearing 134 to effect the retention thereon which is assured by a cotter pin 136 projecting through the free extremity of the pin 135.

The transverse tubular bearing 134 comprises, in this instance, a part of a triangular socket bracket 137 which forms the apex of a triangular frame defined by rods 138—139—140. Rods 138—139—140 are welded or otherwise joined to the triangular apex socket bracket 137 while corner socket brackets 141 and 142 receive the other extremities of the rods 138—139 for permanent connection thereto. It should be noted that the base rod 140 of the triangular boom frame 138—139—140 is, in this instance, of larger diameter than the side rods 138—139 and correspond in diameter with the end brackets 141—142 for positioning therebetween (Figure 8). An elongated pintle pin 143 is axially disposed through the tubular rod 140 and bearings 141—142 to effect the retention of the boom 133 with its triangular base 138—139—140 in operative connection with the top extremity bearing 141'—142' of the column 98. A cotter pin 144 peripherally projects through the extremity 145 to the pintle pin 143.

The boom 133 projects at an oblique angle to the column 98, and in the present embodiment comprises three elongated corner rods 146—147—148. The corner rods 146—147—148 are anchored at corresponding extremities to the corner socket brackets 137—141—142 to terminate in a socket bracket 149 (Figures 2 and 6) to which they are welded or otherwise joined to define a boom of triangular configuration with the rod 146 appreciably longer than the rods 147—148 to prescribe the desired oblique angle of boom suspension relative to the vertical column 98. The tri-rod boom 133 is reinforced by angularly disposed brace rods 150—151 that extend from the corner socket brackets 141—142 to a sleeve 152 which envelops the boom rod 146 for welded joinder therewith and intersecting extremities of the brace rods 150—151. The tubular sleeve 152 also has triangular brace rods 154—155 extending therefrom in a direction opposite to the brace rods 150—151, for welded joinder at their extremities 156—157 to the rods 147—148 proximate to the boom-end bracket 149. A transverse brace rod 158 extends between the juncture of the brace rod extremities 156—157 with the boom rods 147—148. At these points of juncture another set of triangular brace rods 159—160 extend parallel to the brace rods 150—151 so that their intersecting extremities may be welded or otherwise joined as at 161 to the boom rod 146, thereby bracing the boom 133 along the entire length thereof.

To the end of providing hoisting instrumentalities, the extreme end of boom bracket 149 has a transverse tubular bearing 162 that serves to suspend space bracket plates 163—164 (Figures 2 and 6). The space plates 163—164 are rigidly joined to the transverse bearing 162 to depend therefrom to effectively support a transverse stub shaft 165 that extends therebetween for connection through the medium of nut fasteners 166—167 in threaded engagement with the extremities of the stub shaft 165 (Figure 2). A sheave 168 is journalled on the stub shaft 165, it being provided with a grooved periphery 169 to carry a tension cable 170 thereover. The tension cable 170 terminates in a hook 171 which serves to engage the flexible loop or other expedient for either enveloping a device that is to be lifted therewith or otherwise attached thereto unless such devices or parts to be lifted with the hook 171 have complemental fastening expedient for engagement therewith.

The tension cable 170 extends between the boom rods 146—147—148 for guidance over an idler sheave 172 which is mounted for journaled rotation on a bracket 173 attached to the sleeve 104 which is welded or otherwise joined as described supra to the column rod 99. The bracket 173 corresponds substantially with the bracket plates 163—164 (Figure 2), and these are attached to the sleeve 104, similar to the mode of attachment of the plates 163—164 to the bearing 162. The idler sheave 162 guides the tension cable 170 thereover to extend vertically downwardly within the column 98 for operative connection and convolute winding over the drum 174 of a winch 175 of suitable or standard construction. In the present embodiment the winch 75 is manually operated by a handle 176 although other sources of power may be utilized depending upon the dictates of commercial practice. The winch 175 is bolted as at 177—178 (Figure 1) to angle brackets 179—180 and 181 welded or otherwise permanently joined to the angularly disposed rods 26—26' of the triangular section of the base frame 22 (Figure 9).

With this arrangement, the hook 17 may be detached from the cable 170 which is wound on the winch drum 174 whenever it is desired to separate the base frame 22 from the column 98, and the boom 133 from the latter. To accomplish this end it is only necessary to remove a pin 135 from between the plates 129—130, and withdraw the pintle pin 143 from the sleeve rod 140 and the brackets 141—142, thereby enabling the boom 133 to be lifted or detached therefrom. The column 98 is similarly detached from the frame 22 by removing one or the other of the bolts 119—120, and both of the legs 45—46 are detachable from the frame 22 by removing the pin or bolt 96 or 97 from each of the transverse bearings 92—93 of the base frame 22 (Figure 9). This accounts for the complete dismantling of the entire structural unit so that they may be conveniently carried in aircraft or other vehicles from one point to another wherever required for servicing and maintenance. A light, strong, and comparatively inexpensive portable hoist has thus been provided which is primarily adaptable for maintenance and replacement of essential parts of aircraft such as engines, wings, under-carriage, and similar major parts that are much too heavy for manual lifting into position.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a device of the character described, the combination with a plurality of complemental truss-rod three-dimensional strut sections including angularly related leg units to define a frame, means for detachably associating said frame sections, a truss-rod column section detachably associated with said frame, hoist means associated with said column and frame, and means for locking said detachable frame section and column against accidental displacement.

2. In a portable sectional device of the character described, the combination with a plurality of complemental truss-rod three-dimensional strut sections comprising detachable associated self-sustaining base, leg, column and boom units, of wheel mounted castor trucks on said base and leg units to serve as a movable support for all of said units, one of said wheel mounted castor trucks being pivotally connected to said base, means for detachably associating said leg units with said base unit, a handle attached to said pivotally connected castor truck to enable the steering thereof, means for detachably connecting said units against accidental separation, and hoist means associated with certain of said units.

3. In a portable hoist device of the character described, the combination with a plurality of complemental three-dimensioned strut sections comprising self-sustaining truss-rod, base, leg, column and boom units of substantially triangular cross-section, of wheel mounted castor trucks on said base and leg units to serve as a support therefor, means for detachably associating said units, means for readily connecting said units against accidental separation, and hoist means associated with said boom, column and base units.

4. In a device of the character described, the combination with a plurality of complemental truss-rod three-dimensional strut sections comprising detachably associated self-sustaining base, column, boom and angularly spaced leg units, said units being of substantially triangular cross-sectional configuration, of wheel mounted castor trucks on said base and leg units to serve as a support therefor, means for detachably connecting said units against accidental separation, said column unit being vertically associated with said base, said boom unit being angularly associated with said column, and said leg units being angularly associated with said base.

5. In a device of the character described, the combination with a plurality of complemental three-dimensional strut units including spaced leg units and a base unit detachably connected to define a frame, of wheel mounted castor trucks on said frame units to serve as a support therefor, means for detachably connecting said frame units against accidental separation, a column unit detachably associated with said frame units, an angularly disposed boom unit detachably associated with said column unit, said units being of tubular rod construction having triangular cross-sectional configurations, and hoist means associated with said boom, column and frame units.

6. In a portable sectional device of the character described, the combination with a plurality of complemental three dimensional strut units including a base and angularly spaced leg units to define a frame, of wheel mounted castor trucks on said frame to serve as a support therefor, one of said wheel mounted trucks being pivotally connected to said frame to enable the steering thereof, means for detachably connecting said base and leg units to define a sectional frame, a vertical unit detachably associated with said frame, an angularly disposed boom unit detachably associated with said column unit, said units being of truss-rod triangular construction to render each self-sustaining, and hoist means associated with said boom, column and frame.

7. In a device of the character described, the combination with a plurality of complemental three-dimensional strut units including a base and angularly spaced leg units to define a frame, of wheel mounted castor trucks on said frame to serve as a support therefor, one of said wheel mounted trucks being pivotally connected to said frame, a handle attached to said pivotally connected castor trucks to enable the steering movement thereof, means for detachably connecting said base and leg units to define a sectional frame, a vertical unit detachably associated with said frame, a boom unit detachably associated with said column unit, means for locking said units together against accidental separation, said units being of truss-rod triangular construction to render each self-sustaining, and hoist means associated with said boom, column and frame.

8. In a portable sectional hoist device of the character described, the combination with a plurality of complemental three dimensional strut base and leg units to define a frame, of means for detachably connecting said frame units, a vertical column unit detachably connected with said base unit, said units being of tubular rod construction having triangular cross-sectional configuration, hoist means associated with said column and base units, and means for locking said detchable frame and column units against accidental displacement.

9. In a device of the character described, the combination with a plurality of complemental truss-rod three-dimensional strut sections including a base unit, angularly related self-sustaining leg units, means for detachably associating said base and leg units, wheeled floor mounting trucks on said base and leg units to render such portable, one of said wheeled mounting trucks being pivotally connected to a forward portion of said base unit, a handle operatively connected to said pivotally connected wheeled truck for pulling and steering purposes, a truss-rod column unit detachably associated with said base unit, hoist means associated with said column and base units, and means for locking said detachable units against accidental separation.

CHARLES E. WATSON.